United States Patent
Filippov et al.

(10) Patent No.: US 9,260,954 B2
(45) Date of Patent: Feb. 16, 2016

(54) LINEAR ELECTRIC MOTOR FOR ARTIFICIAL LIFT SYSTEM

(71) Applicant: Oilfield Equipment Development Center Limited, Victoria (SC)

(72) Inventors: Alexandr Vasilievich Filippov, Moscow (RU); Salikhyan Shakirianovich Sharipov, Moscow (RU); Vladimir Iosifovich Sagalovskiy, Moscow (RU); Andrei Vladimirovich Sagalovskiy, Moscow (RU)

(73) Assignee: Oilfield Equipment Development Center Limited, Victoria, Seychelles ( * ) Notice: Subject to any disclaimer, the term of this patent is extended or adjusted under 35 U.S.C. 154(b) by 412 days.

(21) Appl. No.: 13/791,217

(22) Filed: Mar. 8, 2013

(65) Prior Publication Data

US 2013/0186638 A1 Jul. 25, 2013

Related U.S. Application Data

(63) Continuation-in-part of application No. PCT/RU2012/000401, filed on May 21, 2012.

(30) Foreign Application Priority Data

May 23, 2011 (RU) ................................ 2011120410

(51) Int. Cl.
*E21B 43/12* (2006.01)
*H02K 33/16* (2006.01)
*H02K 41/03* (2006.01)

(52) U.S. Cl.
CPC .............. *E21B 43/128* (2013.01); *H02K 33/16* (2013.01); *H02K 41/031* (2013.01); *Y10T 29/49009* (2015.01)

(58) Field of Classification Search
CPC ..... E21B 43/128; H02K 33/16; H02K 41/031
See application file for complete search history.

(56) References Cited

U.S. PATENT DOCUMENTS 4,215,283 A * 7/1980 Hinds ............................. 310/14
4,358,691 A 11/1982 Naylor
(Continued)

FOREIGN PATENT DOCUMENTS

| RU | 114240 U1 | 3/2012 |
|---|---|---|
| RU | 114241 U1 | 3/2012 |

(Continued)

OTHER PUBLICATIONS

U.S. Appl. No. 13/557,455, filed Jul. 25, 2012, entitled "Encapsulated Rotor for Permanent Magnet Submersible Motor," Vladimir Iosifovich Sagalovskiiy et al.

(Continued)

*Primary Examiner* — Robert E Fuller
(74) *Attorney, Agent, or Firm* — Patterson & Sheridan, LLP

(57) ABSTRACT

A method for pumping production fluid from a wellbore includes deploying a downhole assembly of an artificial lift system (ALS) into the wellbore. The downhole assembly includes a linear electric motor (LEM) and a pump. The method further includes operating the LEM, thereby reciprocating the pump and lifting production fluid from the wellbore to surface. The LEM includes a stator and a reciprocating head having permanent magnets. The production fluid leaks through an interface formed between the head and the stator.

15 Claims, 7 Drawing Sheets

(56) References Cited

U.S. PATENT DOCUMENTS

| | | | |
|---|---|---|---|
| 4,687,054 A | | 8/1987 | Russell et al. |
| 5,734,209 A | * | 3/1998 | Hallidy ............... 310/12.22 |
| 7,789,637 B2 | | 9/2010 | Feng et al. |
| 2007/0295515 A1 | | 12/2007 | Veneruso et al. |
| 2008/0080991 A1 | | 4/2008 | Yuratich et al. |
| 2009/0058221 A1 | | 3/2009 | Liu |

FOREIGN PATENT DOCUMENTS

| | | |
|---|---|---|
| SU | 639099 A1 | 12/1978 |
| SU | 1012391 A1 | 4/1983 |
| WO | 94/06193 A1 | 3/1994 |
| WO | 2012161625 A2 | 11/2012 |

OTHER PUBLICATIONS

Lakhtin Iu M. et al.—Khimiko-termicheskaia obrabotka metallov. Moskva, Metallurgiia, 1985, p. 141, Glava Y, Azotirovanie [Google translation of citation: Lahtinen M. et al., Chemical heat treatment of metals, Moscow, Metallurgy, 1985, p. 141].

Publikatsiia, Provoda obmotochnye teplostoikie diia pogruzhnykh elektrodvigatelei marok PPFI-F and PPFI-K, Jun. 24, 2009 [retrieved on Jul. 11, 2012] Found on internet <URL:http.7/www.laborant.ru/eltech/19/I/I/35-98.htm. with machine translation of article into English [Collector DC motors of low power with electromagnetic excitation of the D-108M].

PCT Search Report dated Nov. 15, 2012, for International Application No. PCT/RU2012/000401.

* cited by examiner

US 9,260,954 B2

LINEAR ELECTRIC MOTOR FOR ARTIFICIAL LIFT SYSTEM

BACKGROUND OF THE INVENTION

1. Field of the Invention

Embodiments of the present invention generally relate to a linear electric motor for an artificial lift system.

2. Description of the Related Art

Crude oil is often produced using a sucker rod pump driven by a surface mounted pumping jack. However, this system of artificial lift is very inefficient. Not only are the pumps and the sucker rod connecting the downhole pump to the pumping jack very expensive, but they also suffer from several technical problems.

One of the major problems is that, since most wells are not straight, the sucker rod usually rubs against the tubing in a number of places. This problem is even more severe in wells that are intentionally directionally drilled and whose deviation from perfect straightness can be quite large. Not only does this wear the sucker rod and the tubing, necessitating the costly replacement of both, but the friction between the sucker rod and the tubing wastes energy and requires that more powerful motors be used to operate the pumping jack. In cases where the sucker rod completely wears through the tubing, there is also the problem of losing production from the production tubing back into the well casing. This rubbing action also causes the tubing to move up and down with the rods, necessitating the installation of tubing anchors.

Other problems associated with present sucker rod pumping systems are breakage of the bridle line connecting the pumping jack head to the polish rod, freezing of engine fluids in cold weather, pollution from engine exhaust, and leaks around the wellhead associated with the moving seal between the polish rod and the stuffing box.

SUMMARY OF THE INVENTION

Embodiments of the present invention generally relate to a linear electric motor for an artificial lift system. In one embodiment, a submersible linear electric motor for use in a wellbore includes a stator and a head. The stator includes a tubular housing; support rings disposed in and along the housing and having an inner diameter; and annular coils disposed in and along the housing between the support rings. Each coil has: a magnetically permeable stator core having a cavity formed therein and an inner diameter greater than the support ring diameter; and a winding disposed in the cavity. The head is disposed in the housing and longitudinally movable relative thereto. The head has: a shaft; magnetically permeable annular head cores disposed along the shaft and having an outer diameter; annular permanent magnets disposed along the shaft between the head cores; and a protector disposed around an outer surface of each magnet and having an outer diameter less than the core diameter. The support ring diameter and the head core diameter correspond to form a clearance fit or line fit between the head cores and the support rings.

In another embodiment, a method for pumping production fluid from a wellbore includes deploying a downhole assembly of an artificial lift system (ALS) into the wellbore. The downhole assembly includes a linear electric motor (LEM) and a pump. The method further includes operating the LEM, thereby reciprocating the pump and lifting production fluid from the wellbore to surface. The LEM includes a stator and a reciprocating head having permanent magnets. The production fluid leaks through an interface formed between the head and the stator.

In another embodiment, a method for manufacturing a linear electric motor includes: sintering a powdered magnetically permeable material into an annular stator core; coating the stator core with a corrosion resistant material; wrapping wire onto an annular spool; encapsulating the winding onto the spool to form a wound spool; inserting the wound spool into a cavity of the coated stator core to form a coil; and inserting support rings and a plurality of coils into a tubular housing. The coils are disposed between the support rings. Each core has an inner diameter greater than an inner diameter of each support ring.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
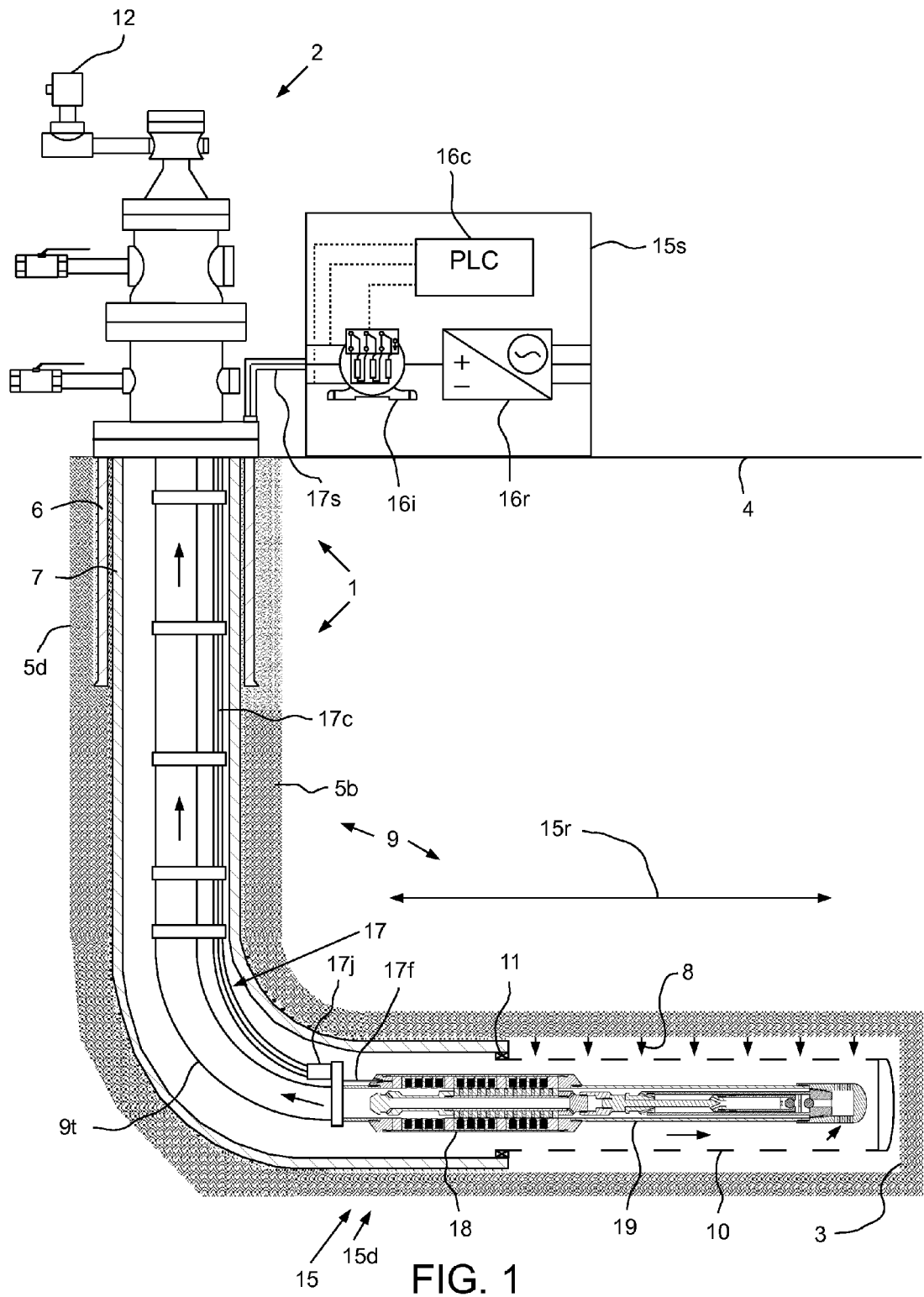
FIG. 1 illustrates an artificial lift system (ALS) pumping production fluid from a wellbore, according to one embodiment of the present invention.

FIG. 1 illustrates an artificial lift system (ALS) 15 pumping production fluid 8 from a wellbore 3, according to one embodiment of the present invention. The production fluid 8 may be crude oil, bitumen, heavy crude oil, or oil shale.

The ALS 15 may include a motor driver 15s, a power cable 17, and a downhole assembly 15d. The downhole assembly 15d may include a submersible linear electric motor (LEM) 18 and a reciprocating pump 19. The wellbore 3 may be part of a completed well 1. The well 1 may further include a wellhead 2 located adjacent to a surface 4 of the earth. The wellbore 3 may extend from the surface 4 vertically through a non-productive formation 5d and horizontally through a hydrocarbon-bearing formation 5b (aka reservoir). Alternatively, the horizontal portion of the wellbore 3 may be other deviations besides horizontal. The well 1 may further include a surface casing 6 extending from the wellhead 2 into the wellbore 3 and sealed therein with cement. The well 1 may further include an intermediate casing 7 extending from the wellhead 2 and into the wellbore 3 and sealed therein with cement.

The well 1 may further include a production string 9 extending from the wellhead 2 and into the wellbore 3. The production string 9 may include a string of production tubing 9t and a portion of downhole assembly 15d connected to a bottom of the production tubing. A slotted liner 10 may be hung 11 from a bottom of the intermediate casing 7 and extend into an open hole portion of the wellbore 3. The downhole assembly 15d may extend into the slotted liner 10. Alternatively, the downhole assembly 15d may extend to a bottom of the intermediate casing 7 or be disposed in the vertical portion of the wellbore 3.

The motor driver 15s may provide power and control to the LEM 18. A surface cable 17s may extend from the motor driver 15s to the wellhead 2. The surface cable 17s may connect to a penetrator at the wellhead 2. The penetrator may connect the surface cable 17s to a downhole cable 17c. The downhole cable 17c may extend down a length of the production tubing 9t and may be fastened to the production tubing at various intervals. The downhole cable 17c may terminate at a splice 17j located adjacent to the downhole assembly 15d. The splice 17j may connect the downhole cable 17c to a motor lead extension (MLE) cable 17f. The MLE cable 17f may terminate at a pothead 21 (FIG. 2A) of the LEM 18. The pothead 21 may connect the MLE cable 17f to internal lead wires (not shown) connected to stator coils 23 (FIG. 2A) of the LEM 18. The power cable 17 may include a conductor for each phase u-w (FIG. 2A) of the LEM 18, an insulating jacket for each conductor, a fluid barrier, a buffer, and armor.

The motor driver 15s may include a rectifier 16r, an inverter 16i, a programmable logic controller (PLC) 16c, and one or more sensors (not shown), such as a voltmeter and one or more ammeters. The motor driver 15s may receive a three phase alternating current (AC) power signal from a utility grid or generator (not shown). The rectifier 16r may convert the three phase AC power signal to a direct current (DC) power signal and supply the converted DC power signal to the inverter 16i. The inverter 16i may have an output for each stator phase u-w of the motor 18 and may modulate the DC power signal to drive each phase of the stator 20s based on control signals from the PLC 16c. The sensors may measure voltage and current of one or more of the inverter outputs and be in data communication with the PLC 16c.

Alternatively, the motor driver 15s and pothead 21 may each include a transformer (not shown). The motor driver transformer may increase voltage of the modulated power signals for transport along the cables 17s,c,f and the pothead transformer may reduce the voltage for delivery to the stator 20s. Alternatively, a production packer (not shown) may be set between the production tubing 9t or downhole assembly 15d (above the LEM 18) and the intermediate casing 7.

In operation, the motor driver 15s may supply the LEM 18 with the modulated power signals via the power cable 17 to reciprocate 15r the head 20h. The head 20h may in turn reciprocate 15r a plunger 45 (FIG. 2B) of the pump 19. The pump 19 may draw production fluid 8 from the liner 10 and then discharge the production fluid 8 into the production tubing 9t. The production tubing 9t may then transport the production fluid 8 through the wellhead 2 and to a production choke 12.

Figures 2A, 2B:
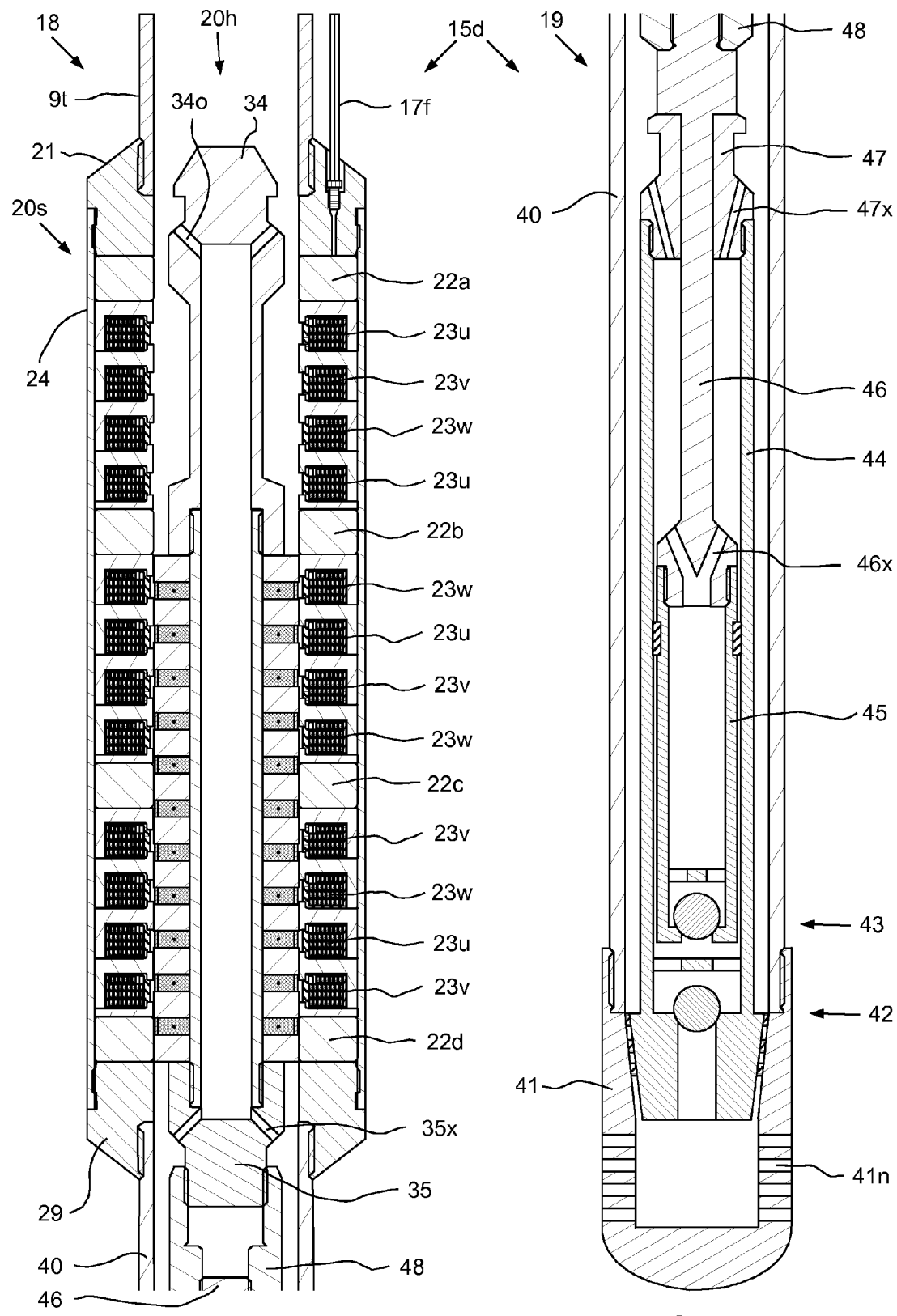
FIGS. 2A and 2B illustrate a downhole assembly of the ALS.
Figure 3:
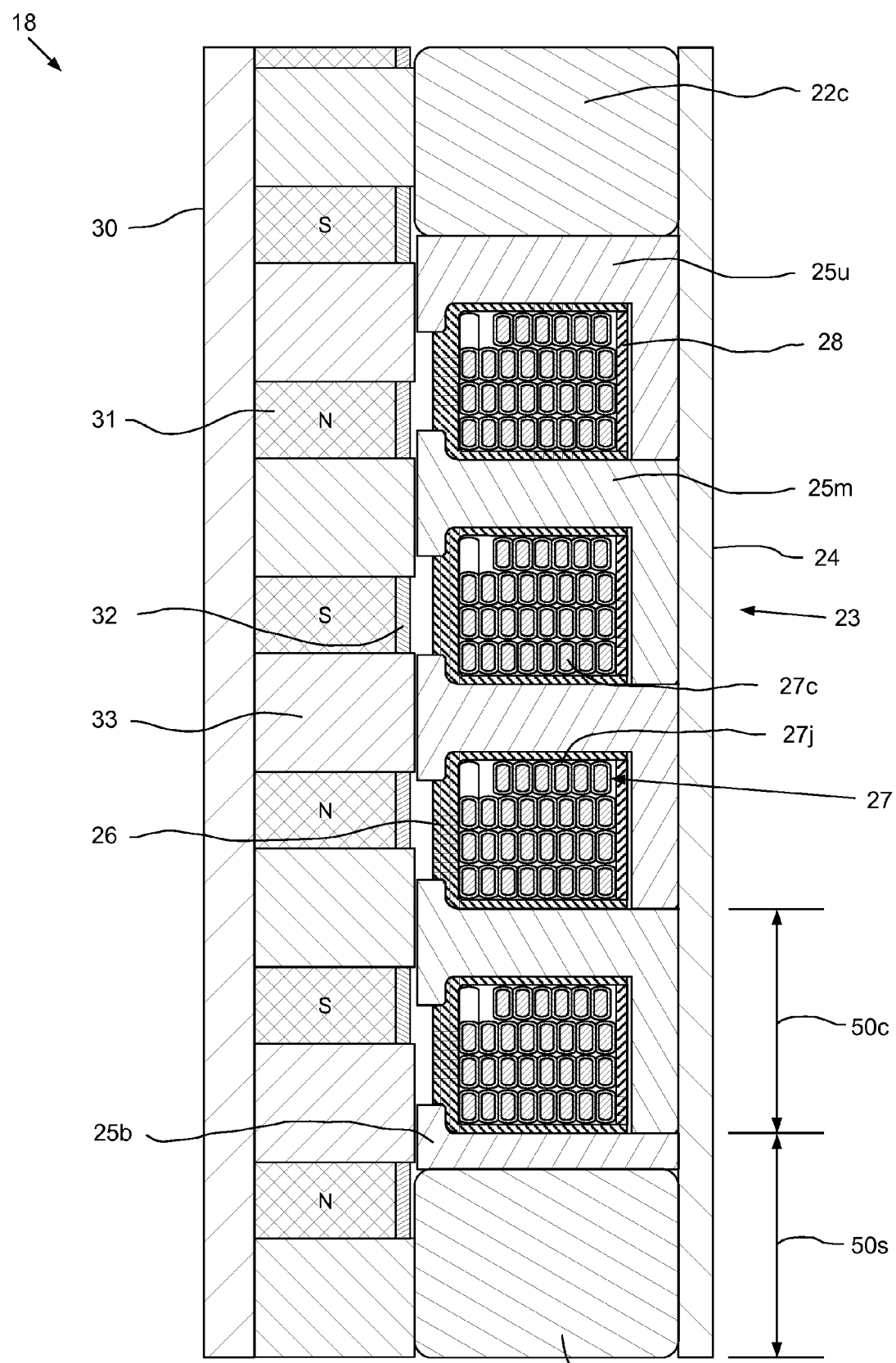
FIG. 3 illustrates a linear electric motor (LEM) of the downhole assembly.
Figure 4A:
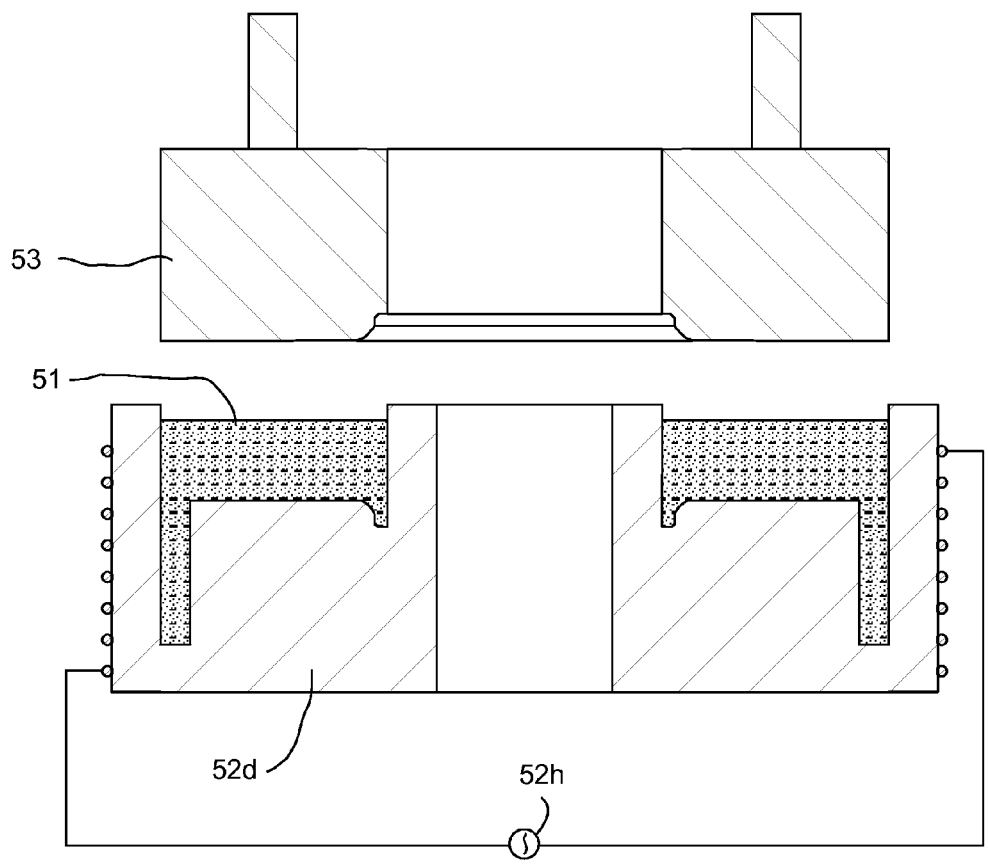
FIGS. 4A-4D illustrate manufacture of a mid stator core of the LEM.
Figure 4B:
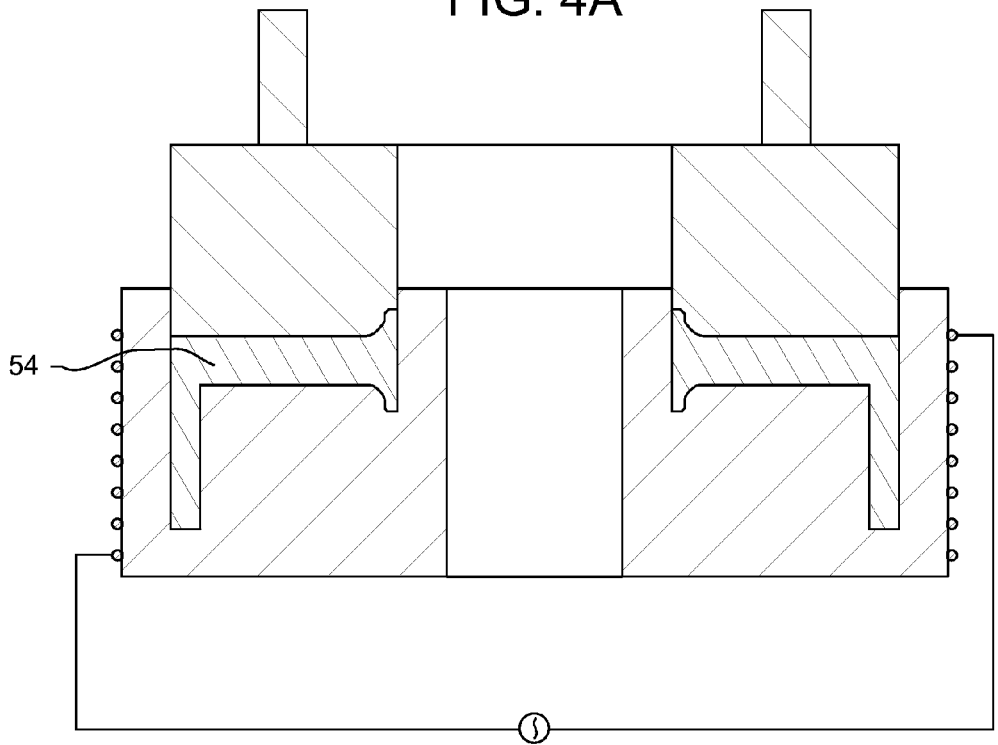
Figure 4C:
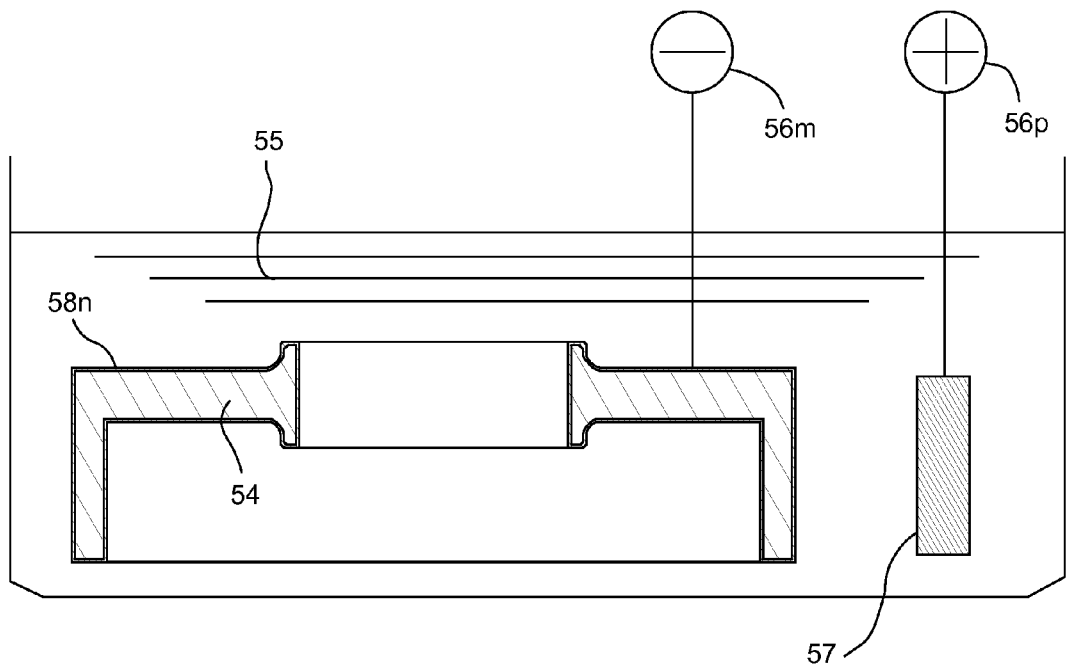
Figure 4D:
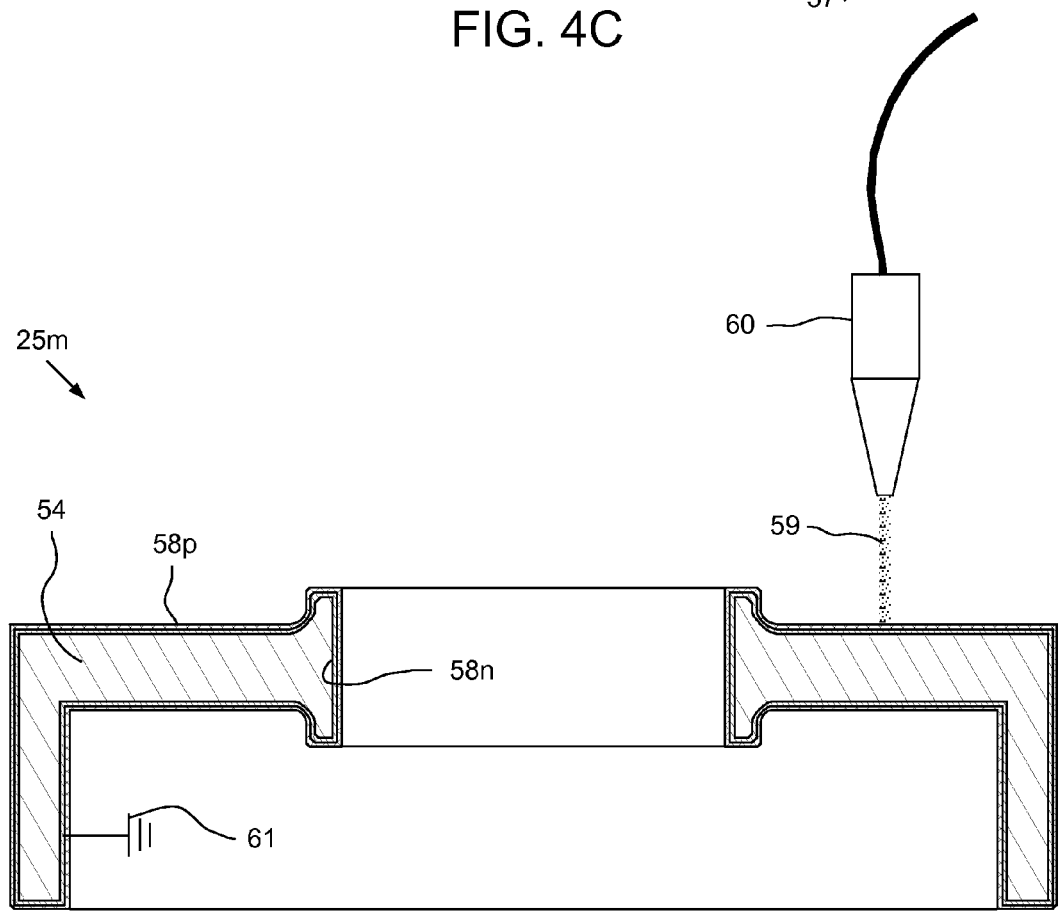

FIGS. 2A and 2B illustrate the downhole assembly 15d. The LEM 18 may include the stator 20s and the reciprocating head 20h. FIG. 3 illustrates the LEM 18. The stator 20s may include a pothead 21, one or more support rings 22a-d, one or more coils 23 for each phase u-w of the stator, a housing 24, and an adapter 29. The housing 24 may be tubular and have a bore formed therethrough. The pothead 21 may be connected to an upper end of the housing 24, such as by a threaded connection, and the adapter 29 may be connected to a lower end of the housing, such as by a threaded connection. A lower end of the production tubing 9t may be connected to the pothead 21, such as by a threaded connection. An upper end of a housing 40 of the pump 19 may be connected to the adapter 29, such as by a threaded connection. The coils 23 and the support rings 22a-d may be mounted in the housing 24, such as by a press fit, and may be trapped between the pothead 21 and the adapter 29. End support rings 22a,d may be located adjacent each end of the housing 24 and a group of one or more (four shown) coils 23 may be disposed between each end support ring 22a,d and a respective intermediate support ring 22b,c and between the intermediate support rings.

The head 20h may include a shaft 30, a plurality of permanent magnets 31, a magnet protector 32 for each permanent magnet, cores 33 straddling each permanent magnet 31, a fishing neck 34, and an adapter 35. The shaft 30 may be tubular and have a bore formed therethrough. The fishing neck 34 may be connected to an upper end of the shaft 30, such as by a threaded connection, and the adapter 35 may be connected to a lower end of the shaft 30, such as by a threaded connection. An upper end of a rod coupling 48 of the pump 19 may be connected to the adapter 35, such as by a threaded connection. The fishing neck 34 and adapter 35 may each have one or more crossover ports 34o, 35x formed therethrough.

The permanent magnets 31 and head cores 33 may be mounted along an outer surface of the shaft 30, such as by a press fit, and may be trapped between the fishing neck 34 and the adapter 35. The magnets 31 may be evenly spaced along the shaft 30. The head cores 33 may each be annular and made from a magnetically permeable and corrosion resistant metal or alloy, such as stainless steel (i.e., ferritic or martensititc). An outer surface of each head core 33 may be case hardened, such as by nitriding. The permanent magnets 31 may each be made from a (magnetically hard) ferromagnetic metal or alloy, such as alnico or rare earth alloy, such as samarium-cobalt or neodymium. Alternatively, the permanent magnets 31 may each be made from a ferrimagnetic material, such as ferrite or a garnet. Each adjacent permanent magnet 31 may have an opposite polarity N, S. Each permanent magnet 31 may be annular and may be unitary (shown).

Each protector 32 may be annular and mounted on an outer surface of a respective permanent magnet 31, such as by press fit. Each protector 32 may be made from a low conductivity (or non-conductive), low magnetic permeability (or non-magnetic), and corrosion resistant material, such as a metal or alloy (i.e., austenitic stainless steel or titanium). The shaft 30 may also be made from any of the protector materials.

The housing 24 and support rings 22a-d may also each be made from any of the protector materials. An inner surface of each support ring 22a-d may also be case hardened, such as by nitriding. Each stator coil 23 may include a core 25u,m, a spool 26, a winding 27, and a shroud 28. The stator 20s may further include a lower core 25b for each support ring 22b-d (except the upper support ring 22a). Each stator core 25u,m,b may be made from a magnetically permeable metal or alloy, such as electrical steel. Each stator core 25u,m,b may be annular and have an L shaped cross section forming a cavity for receiving a respective spool 26. The cross section of each mid core 25m may have an inner T shaped flange for radially retaining adjacent spools 26. The cross section of each upper 25u and lower 25b core may have a truncated inner flange so that an opposing face thereof is flat for abutting a respective support ring 22a-d. Each spool 26 may be made from a low conductivity (or non-conductive), low magnetic permeability (or non-magnetic) material, such as a polymer (i.e., engineering thermoplastic). Each winding 27 may include a length of wire wound onto a respective spool 26 and having a conductor 27c and a jacket 27j. The conductor 27c may be made from an electrically conductive metal or alloy, such as aluminum, copper, or alloys thereof. The jacket 27j may be made from an insulating polymer, such a fluoropolymer (i.e., polytetrafluoroethylene (PTFE)). The stator 20s may further include the internal lead wires connecting coils 23 of each phase u-w together in series or parallel and connecting the phases together in a delta or wye configuration.

An outer diameter of each head core 33 may correspond to an inner diameter of each support ring 22a-d to form a clearance fit therebetween. The clearance fit may be a loose running fit, free running fit, a close running fit, or a sliding fit. Alternatively, a line fit may be formed between the head cores 33 and the support rings 22a-d. An outer diameter of each protector ring 32 may be less than the outer diameter of each head core 33. An inner diameter of each stator core 25u,m,b may be greater than the inner diameter of each support ring 22a-d. An inner diameter of each spool 26 may be greater than the inner diameter of each stator core 25u,m,b.

The phases u-w may be evenly spaced along the stator 20s. To account for the intermediate support rings 22b,c, a combined length 50s of each support ring 22b-d and lower core 25b may correspond to a (non-flange) length 50c of each of the upper and mid stator cores 25u,m, such as being equal to. The phase u-w that would be present where the respective intermediate support ring 22b,c is may then be skipped, such as skipping the phase v for the support ring 22b and skipping the phase u for the support ring 22c. Alternatively, a length of the lower cores 25b may be neglected. Alternatively, the upper and lower support rings 22a,b may have nonconforming lengths. Alternatively, three coils 23 (for a three phase LEM) may be disposed between each pair of support rings 22a-d or a support ring (and lower core 25b) may be disposed between each coil 23.

The reciprocating pump 19 may include the housing 40, a shoe 41, a standing valve 42, a traveling valve 43, a barrel 44, a plunger 45, a drive rod 46, a rod head 47, and a coupling 48. The housing 40 may be tubular and have a bore formed therethrough. The shoe 41 may be connected to a lower end of the housing 40, such as by a threaded connection. The shoe 41 may have a tapered inner surface for receiving a complementary tapered outer surface of a lower end of the barrel 44. One or more (three shown) seals may be disposed between the tapered surfaces for isolating an interface formed therebetween. The shoe 41 may also have a plurality of inlet ports 41n formed through a wall thereof for intaking production fluid 8. Alternatively, the pump 19 may further include a latch carried on the barrel lower end and the shoe 41 may further have a latch profile formed in an inner surface thereof for engaging the latch, thereby fastening the barrel 44 to the shoe 41. Alternatively, the pump inlet may be a separate component, such as a static gas separator, depending on the gas content of the production fluid 8.

The standing valve 42 may include the barrel lower end and a valve member, such as a ball. The barrel lower end may further include a passage formed therethrough and a seat formed in an upper face thereof for receiving the ball. The barrel lower end may further have a fluted stop ring for trapping the ball during an upstroke of the plunger 45 while allowing flow of production fluid 8 through the standing valve 42. The rest of the barrel 44 may be tubular and have a bore formed therethrough. An upper end of the barrel 44 may be connected to the rod head 47, such as by a threaded connection.

The traveling valve 43 may include a lower end of the plunger 45 and a valve member, such as a ball. The plunger lower end may further include a passage formed therethrough and a seat formed in an upper face thereof for receiving the ball. The plunger lower end may further have a fluted stop ring for trapping the ball during a downstroke of the plunger 45 while allowing flow of production fluid 8 through the traveling valve 43. The rest of the plunger 45 may be tubular and have a bore formed therethrough. The plunger 45 may be disposed in the barrel bore and may be longitudinally movable thereto for reciprocation 15r by the LEM 18. A sliding seal may be carried on an outer surface of the plunger 45 for engaging an inner surface of the barrel 44 and sealing an interface therebetween. An upper end of the plunger 45 may be connected to a lower end of the drive rod 46, such as by a threaded connection.

The rod lower end and rod head 47 may each have one or more crossover ports 46x, 47x formed therethrough. The rod head 47 may have a bore formed therethrough and the rod 46 may extend through the rod head bore and be longitudinally movable relative thereto. The rod head 47 may further carry a sliding seal (not shown) for sealing an interface therebetween. An upper end of the drive rod 46 may be connected to the coupling 48, such as by a threaded connection.

The reciprocating head 20h and the pump 19 (except the housing 40 and shoe 41) may be retrieved from the downhole assembly 15d for replacement by a fishing tool and workline (not shown). Alternatively, the reciprocating head 20h and pump 19 may be non-retrievable and the barrel 44 and pump housing 40 may be integrated into one member. Alternatively, the LEM 18 may be disposed below the pump 19 except that the pump inlet 41n may still be located below the LEM 18.

The path of production fluid 8 through the downhole assembly 15d may include the inlet ports 41n, the standing valve 42, the traveling valve 43, the plunger bore, the crossover ports 46x, the barrel bore, the crossover ports 47x, the pump housing bore, the crossover ports 35x, the LEM shaft bore, the fishing neck bore, and the crossover ports 340. A slight portion of the production fluid 8 may leak through the LEM stator-head interface for lubrication and/or cooling of the stator 20s and/or reciprocating head 20h.

FIGS. 4A-4D illustrate manufacture of the mid stator core 25m. Powder 51 of the magnetically permeable material may be dispensed into a die 52d. A heater 52h may be operated to heat the die 52d and powder 51. A press 53 may then be operated to compact the heated powder 51, thereby sintering the powder 51 into a body 54 of the mid stator core 25m. The body may then be ejected from the die 52d. Additionally, a protective atmosphere (not shown) may be established around the die 52d and the press 53.

The body 54 may then be immersed into an electrolytic solution 55 and connected to a negative terminal 56m of a source of direct current (DC). A slab 57 of corrosion resistant metal or alloy may be immersed in the solution 55 and connected to a positive terminal 56p of the DC source. The corrosion resistant metal or alloy may be nickel or a nickel based alloy. Positive ions may be removed from the slab 57, may migrate through the solution 55, and be deposited onto an outer surface of the body 54 as neutral atoms of a corrosion resistant coating 58n. The coated body 54 may then be removed from the solution 55. Alternatively, the body may be electroless plated.

The coated body 54 may then be heated (not shown) and grounded 61. A fluidized powder mixture 59 of a first polymer reagent and a second polymer reagent may then be discharged from a spray gun 60, such as an electrostatic gun, onto the coating 58n. Contact with the heated coating 58n may melt the powder mixture 59, thereby causing polymerization and forming an outer corrosion resistant coating 58p fusion bonded to the inner coating 58n. The reagents may be epoxide and polyamine, isocyanate and polyol, or phenol and formaldehyde. Additionally or alternatively, the coated body may be heated after spraying. Alternatively, the coated body may be dipped into a polymer resin and cured instead of being sprayed.

Once the outer coating 58p has cured, the mid stator core 25m may be complete. The upper and lower stator cores 25u,b may be manufactured in a similar fashion.

Figure 5A:
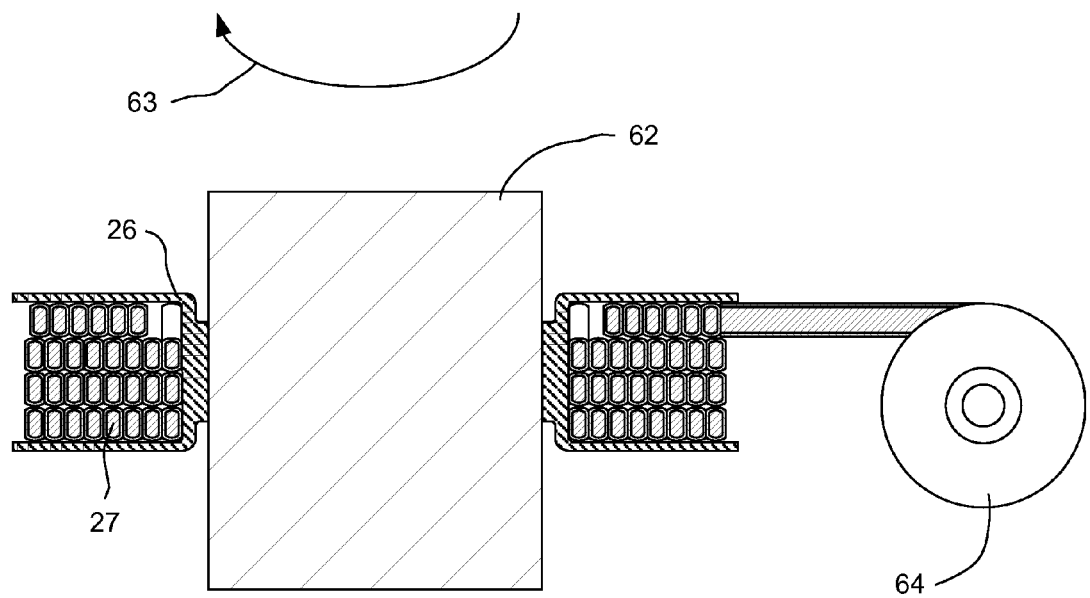
FIGS. 5A-5C illustrate manufacture of the rest of a stator coil of the LEM.
Figure 5B:
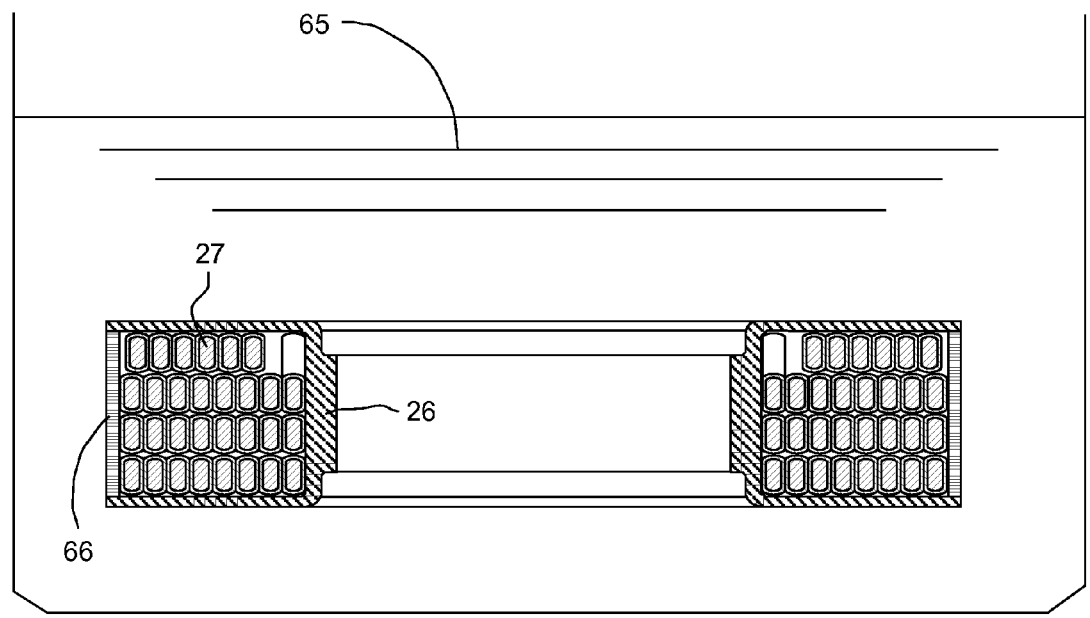
Figure 5C:
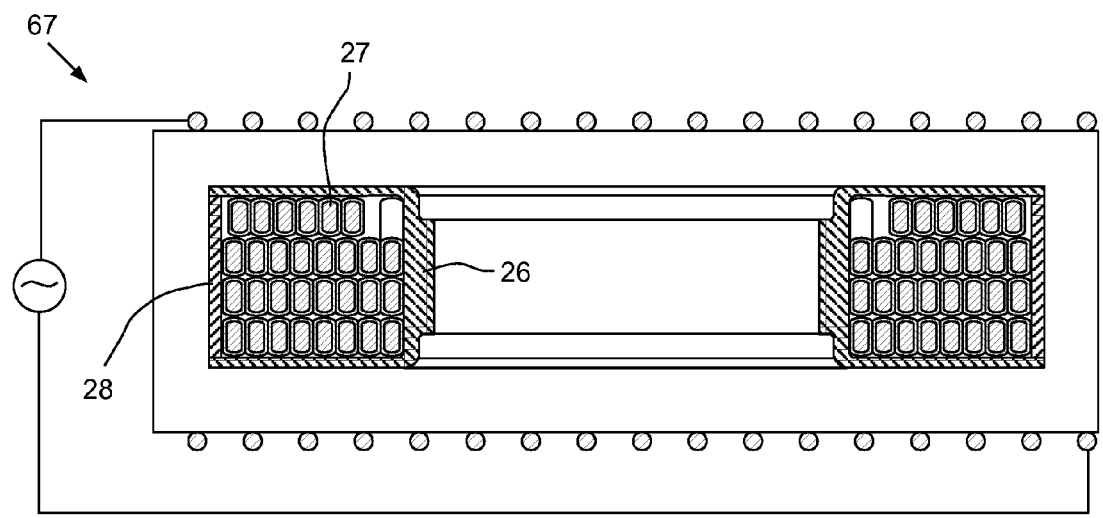

FIGS. 5A-5C illustrate manufacture of the rest of the stator coil 23. The spool 26 may be loaded onto a mandrel 62. The mandrel 62 may be rotated 63, such as by an electric motor (not shown), thereby pulling the wire from a drum 64 and wrapping the wire onto the spool 26, thereby forming the winding 27.

The wound spool 26, 27 may be immersed into an uncured polymer resin 65, thereby encapsulating 66 the winding 27. The encapsulated wound spool 26, 27, 66 may be removed from the resin 65, the spool wiped, and the wound spool placed in an oven 67 and heated and/or irradiated to cure the encapsulating resin 66 into the shroud 28. The shroud 28 may be a low conductivity (or non-conductive), low magnetic permeability (or non-magnetic) engineering thermoplastic, such as polyamide. Alternatively, the wound spool may be dipped into a fluorocarbon resin and cured before immersion into the polyamide resin, thereby forming an inner shroud and an outer shroud.

Figure 6:
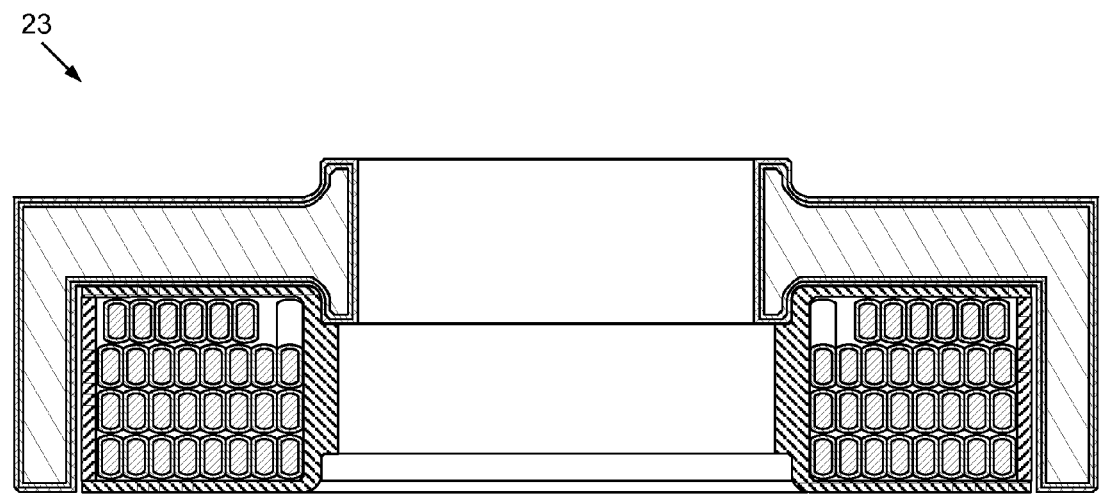
FIG. 6 illustrates an assembled stator coil.

FIG. 6 illustrates an assembled stator coil 23. The stator cores 25u,m,b and support rings 22a-d may be assembled onto a fixture (not shown) and inserted into the stator housing 24. The head 20h may then be inserted into the stator housing 24.

While the foregoing is directed to embodiments of the present invention, other and further embodiments of the invention may be devised without departing from the basic scope thereof, and the scope thereof is determined by the claims that follow.

The invention claimed is:

1. An artificial lift system for use in a wellbore, comprising:
a submersible linear electric motor, comprising:
a stator having:
a tubular housing;
support rings disposed in and along the housing and having an inner diameter;
annular coils disposed in and along the housing between the support rings, each coil having:
a magnetically permeable stator core having a cavity formed therein and an inner diameter greater than the support ring diameter; and
a winding disposed in the cavity; and
a head disposed in the housing, longitudinally movable relative thereto, and having:
a shaft;
magnetically permeable annular head cores disposed along the shaft and having an outer diameter;
annular permanent magnets disposed along the shaft between the head cores; and
a protector disposed around an outer surface of each magnet and having an outer diameter less than the outer diameter of the head cores,
wherein the inner diameter of the support rings and the outer diameter of the head cores correspond to form a clearance fit or line fit between the head cores and the support rings; and
a pump connected to the motor and operable to lift production fluid from the wellbore to surface,
wherein an interface between the head and the stator is in fluid communication with an outlet of the pump for leakage of the production fluid therethrough.

2. The system of claim 1, wherein each stator core has a corrosion resistant coating.

3. The system of claim 2, wherein the corrosion resistant coating comprises an inner layer of a corrosion resistant metal or alloy and an outer layer of a polymer.

4. The system of claim 1, wherein a length of each support ring corresponds to a length of each stator core.

5. The motor of claim 1, wherein each coil further comprises a shroud encapsulating the winding.

6. The system of claim 1, wherein the support rings and head cores are each made from a corrosion resistant metal or alloy and case hardened.

7. The system of claim 1, wherein each protector is a ring made from a corrosion resistant metal or alloy and press fit to the respective magnet.

8. The system of claim 1, wherein the clearance or line fit is a running or slide fit.

9. The system of claim 1, wherein each coil further has a polymer spool and the respective winding is wrapped on the spool.

10. The system of claim 1, wherein a cross section of each stator core is L shaped and has an inner flange.

11. The system of claim 1,
wherein:
the shaft is tubular, and
a bore of the shaft is part of a production fluid path to or from the pump.

12. The system of claim 11, wherein the pump comprises:
a barrel;
a plunger disposed in the barrel and connected to the head;
a traveling valve connected to the plunger; and
a standing valve connected to the barrel.

13. The system of claim 1, wherein an outer portion of each stator core is located adjacent to the housing.

14. The system of claim 1, wherein the motor further comprises a pothead connected to the housing, for connecting to production tubing, for receiving a power cable extending along an outer surface of the production tubing, and for connecting the power cable to the stator coils.

15. The system of claim 14, further comprising the power cable, wherein the power cable is a three phase cable.

* * * * *